June 11, 1935.  R. D. GROCH  2,004,659
TABLE FORK
Filed Aug. 9, 1933
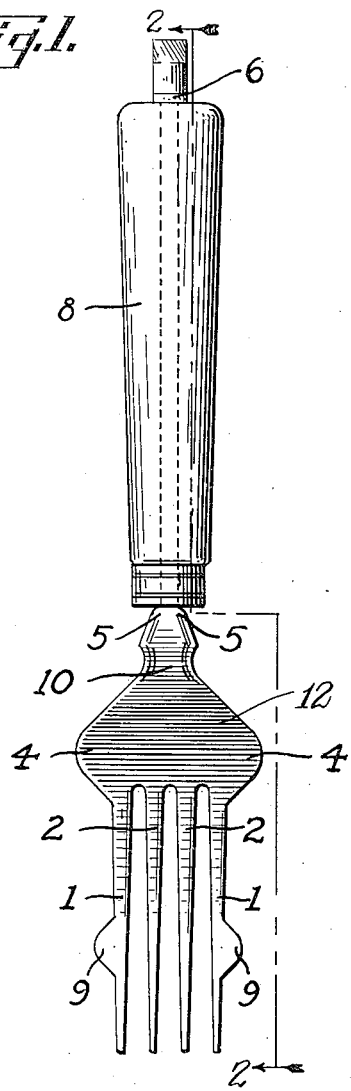
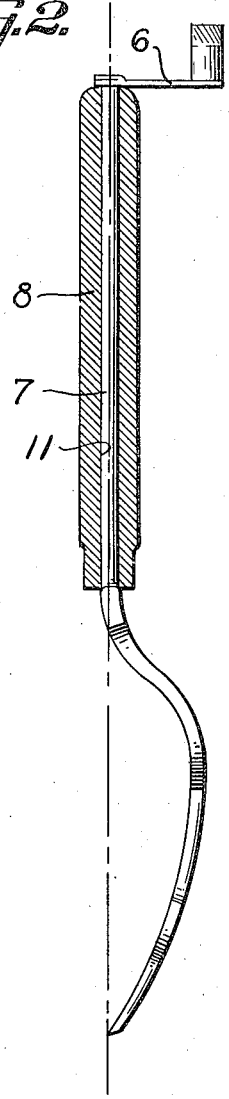
INVENTOR.
Robert D. Groch Patented June 11, 1935

2,004,659

UNITED STATES PATENT OFFICE 2,004,659

TABLE FORK

Robert D. Groch, Sacramento, Calif.

Application August 9, 1933, Serial No. 684,308

5 Claims. (Cl. 30—5)

This invention relates to a table-fork adapted primarily for use in connection with conveyance of spaghetti, macaroni, noodles, spinach, or other string-like food to one's mouth, although capable of use generally as an ordinary table-fork.

The main objects of this invention are to provide a novel construction designed to employ a tine-assemblage, rotatable for convenience in loading the string-like food onto the tine-assemblage; to provide means of preventing the string-like food from slipping off of the tine-assemblage before the utensil is lifted to one's mouth; and to cause the tine-assemblage to automatically assume the normal position for conveying food to one's mouth, when the utensil is held by the handle, only.

The more specific objects and advantages will become apparent from a consideration of the description following, taken in connection with the accompanying drawing illustrating an operative embodiment.

One form of the invention is illustrated in the accompanying drawing, in which Figure 1 is a plan view of the entire utensil; and Figure 2 is a side view of the utensil with a section through the handle on the line 3—3.

Referring specifically to the drawing, inner tines 2—2 are not a departure from the customary inner tines of table-forks. Extending laterally from the outer tines 1—1, near their front end, are lugs 9—9, which keep the string-like food from slipping off of the front end of the tine-assemblage before the utensil is lifted to one's mouth, but allow one's lips to remove the food from the tine-assemblage. Lugs 4—4 extend laterally from the tine assemblage, near its rear end, and prevent the string-like food that is wound around the tine-assemblage from slipping off of the rear end of the tine-assemblage.

The tine-assemblage consists of inner tines 2—2, outer tines 1—1, and the material between the rear end of these tines and shank 10.

The tine-assemblage is rigidly attached at its rear end, to shank 10, which is not a departure from the customary shank of table-forks. Shaft 7, which is an extension of shank 10, extends longitudinally through handle 8, and is designed to rotate, while handle 8 is held without rotating. Shaft 7 is narrower than shank 10, thus forming shoulders 5—5, which prevent handle 8 from sliding forward on shaft 7. Crank 6 bears against rear end of handle 8 and prevents handle 8 from sliding rearward on shaft 7.

When crank 6 is turned, the tine-assemblage rotates, the rotary motion being transmitted from crank 6 to the tine-assemblage by means of shaft 7 and shank 10. Any suitable form of crank may be employed in this invention. Any number of tines from two up, may be employed, the number shown in the drawing forming no part of the present invention.

The utensil may be constructed of such metal as silver, steel, brass, or aluminum; or of such material as celluloid, wood, fiber, or bakelite. However, parts of the utensil may be made of such material as celluloid, wood, fiber, or bakelite, while the remaining parts are made of metal.

In operation, the utensil is held by handle 8, and the points of inner tines 2—2, and of outer tines 1—1, are plunger into spaghetti, or other string-like food. Handle 8 is then held without rotating, while crank 6 is turned in either a clockwise or counter-clockwise direction, thus rotating the tine-assemblage and winding the string-like food around the tine-assemblage. The utensil may now be held by handle 8 only, while being lifted to one's mouth. As will be noted in the drawing, the tine-assemblage is so shaped that the center of gravity of the tine-assemblage is some distance from the axis of rotation of the tine-assemblage. Thus, the tine-assemblage will automatically assume the normal position for conveying food to one's mouth, whether the utensil is loaded with food, or is empty, when the utensil is held by handle 8 only.

The utensil can be used for conveying most any kind of food to one's mouth. Food, other than string-like food will not be wound around the tine-assemblage, but the utensil will be loaded with food by sticking the points of inner tines 2—2, and of outer tines 1—1, into the food, or by sliding the inner tines 2—2, and the outer tines 1—1 under the food, in a manner customary with table-forks. I regard the utensil as a novelty device, and in view of its main purpose I call it a spaghetti-fork.

In the present drawing I have shown my invention in the best form now known to me; but various changes in the details of construction may be made without departing from the spirit of my invention.

I am aware that prior to my invention, table-forks have been made with a plurality of tines rigidly attached to a shank. I, therefore, do not claim such a combination broadly; but

I claim:

1. A table-fork comprising a handle, a tine-assemblage rotatable with respect to the handle, and spaced apart lugs extending laterally from the outer tines, forming food positioning and maintaining means.

2. In a table-fork having a handle, a tine assemblage including a shank and rotatable with respect to the handle, and a shaft extending rearwardly from said shank longitudinally through said handle, said shaft being free to rotate within said handle, and a crank affixed to the rear end of said shaft for rotating the assemblage of tines at will.

3. In combination, a handle having an axial bore, a tine assemblage having tines, and an integral shaft rotatable in the bore in said handle, means associated with said shaft for rotating said tine assemblage relative to said handle, food retaining means integral with certain of said tines and insertion limiting means spaced from the food retaining means, said tine assemblage being eccentrically disposed relative to its axis of rotation and thereby being self-leveling.

4. A spaghetti fork comprising a handle having an axial bore, a shaft extending through the bore and terminating at one end in a shank formed with inner tines and outer tines, said shaft having affixed at its other end, a crank for rotating the shaft.

5. A spaghetti fork comprising a handle having an axial bore, a shaft extending through the bore and terminating at one end in a shank having formed therein inner tines and outer tines, said shaft having affixed at its other end, a crank for rotating said shaft and tines, retaining lugs for food on the outer tines adjacent their terminal ends, and insertion limiting lugs on the shank.

ROBERT D. GROCH.